US007433779B2

(12) United States Patent
Deker et al.

(10) Patent No.: US 7,433,779 B2
(45) Date of Patent: Oct. 7, 2008

(54) METHOD OF FOLLOWING THE COURSE OF THE FLIGHT PLAN OF A COOPERATIVE AIRCRAFT

(75) Inventors: Guy Deker, Cugnaux (FR); Dominique Vanypre, Toulouse (FR)

(73) Assignee: Thales, Neuilly sur Seine (FR)

( * ) Notice: Subject to any disclaimer, the term of this patent is extended or adjusted under 35 U.S.C. 154(b) by 351 days.

(21) Appl. No.: 10/578,300

(22) PCT Filed: Nov. 3, 2004

(86) PCT No.: PCT/EP2004/052761

§ 371 (c)(1), (2), (4) Date: May 4, 2006

(87) PCT Pub. No.: WO2005/045785

PCT Pub. Date: May 19, 2005

(65) Prior Publication Data

US 2007/0078572 A1 Apr. 5, 2007

(30) Foreign Application Priority Data

Nov. 4, 2003 (FR) .................................. 03 12930

(51) Int. Cl.
*G05D 1/00* (2006.01)
*G01C 23/00* (2006.01)

(52) U.S. Cl. .......................... 701/122; 701/8; 701/206; 701/210; 701/300; 342/46; 342/357.04

(58) Field of Classification Search ..................... 701/3, 701/8, 11, 17, 18, 121, 122, 206, 207, 210, 701/302; 343/33, 46, 357.04
See application file for complete search history.

(56) References Cited

U.S. PATENT DOCUMENTS 5,548,515 A 8/1996 Pilley et al.
6,097,996 A 8/2000 Deker
6,161,063 A 12/2000 Deker (Continued)

FOREIGN PATENT DOCUMENTS

EP 0 396 070 A 11/1990

(Continued)

*Primary Examiner*—Thomas G. Black
*Assistant Examiner*—Lin B Olsen
(74) *Attorney, Agent, or Firm*—Lowe Hauptman Ham & Berner, LLP

(57) ABSTRACT

This method relates to the system of ATM air traffic management with cooperative aircraft provided with a flight management computer FMS, that are linked by a data transmission system ATN to the control authority and that have presented a flight plan to the control authority. It consists in communicating to the control authority via the ATN link, the projections SPWPi,j onto the flight plan $LT_{FP}$ of pseudo-waypoints PWPi,j introduced by the flight management computer FMS during lateral (between two segments of the flight plan) and/or vertical (between two breaks in slope) softened transitions performed by the aircraft at the time of the changes of instructions appearing in the flight plan $LT_{FP}$. By virtue of this information, the control authority estimates more precisely the actual future position of the aircraft and the changes of instruction, thereby enabling it to increase the safety level in particular for the spacing and separation of traffic.

5 Claims, 2 Drawing Sheets

U.S. PATENT DOCUMENTS

| | | | | |
|---|---|---|---|---|
| 6,173,219 | B1 | 1/2001 | Deker | |
| 6,181,987 | B1 | 1/2001 | Deker et al. | |
| 6,269,301 | B1 | 7/2001 | Deker | |
| 6,571,171 | B1 * | 5/2003 | Pauly | 701/206 |
| 2004/0078136 | A1 * | 4/2004 | Cornell et al. | 701/120 |
| 2006/0015247 | A1 * | 1/2006 | Speer | 701/206 |
| 2006/0089760 | A1 * | 4/2006 | Love et al. | 701/4 |
| 2006/0119515 | A1 * | 6/2006 | Smith | 342/450 |
| 2008/0059058 | A1 * | 3/2008 | Caillaud et al. | 701/206 |

FOREIGN PATENT DOCUMENTS

| | | | |
|---|---|---|---|
| FR | 2 803 655 | A | 7/2001 |
| GB | 2232316 | A | * 12/1990 |
| WO | 97/28423 | A | 8/1997 |

* cited by examiner

METHOD OF FOLLOWING THE COURSE OF THE FLIGHT PLAN OF A COOPERATIVE AIRCRAFT

CROSS-REFERENCE TO RELATED APPLICATIONS

The present Application is based on International Application No. PCT/EP2004/052761, filed on Nov. 3, 2004, which in turn corresponds to FR 03/12930 filed on Nov. 4, 2003, and priority is hereby claimed under 35 USC §119 based on these applications. Each of these applications are hereby incorporated by reference in their entirety into the present application.

BACKGROUND OF THE INVENTION

1. Field of the Invention

The present invention relates to the following, by a control authority, of the course of the flight plan of an aircraft provided with a flight management computer FMS (Flight Management System) and linked by a data transmission system to the control authority. It is particularly concerned with the management of air traffic by means of the ATM system (Air Traffic Management system).

2. Description of the Related Art

The air traffic control authorities organize aerial movements within the aerial volumes placed under their control on the basis of 4D flight plans, which are submitted to them in advance by the crews of the aircraft. They verify that the various flight plans submitted are compatible with the safety of the various parties before approving them, then they monitor, during their course, the deviations of the aircraft with respect to the forecast positions and give diversion instructions when these deviations tend to close shaves between aircraft which threaten their safety.

A 4D flight plan defines a 3D trajectory skeleton (latitude longitude, altitude) associated with a travel schedule by means of a chaining of waypoints WP which are located, in the path of the aircraft, at places of change of flight constraints and which are associated individually with various local flight constraints: constraints of altitude, of speed, of capture heading, of escape heading, of ground speed, of vertical speed, of date of transit, etc. The chaining of the waypoints WP defines the lateral projection of the route envisaged. The local flight constraints determine the vertical projection of the route envisaged and the travel schedule. The following of a flight plan by an aircraft consists in homing in on the waypoints WP in the order of their chaining by traveling, between two successive waypoints WP, along a straight segment (or "leg"), in fact a segment of large terrestrial circular arc, while complying with the local constraints associated with the waypoints WP delimiting the ends of the segment.

The crew or the flight management computer FMS of an aircraft determines the 3D trajectory actually followed by the aircraft based on the 3D trajectory skeleton of the flight plan and the travel schedule that are specified in the flight plan, and while taking account of the maneuvering capabilities of the aircraft and a desired degree of comfort. The taking into account of the maneuvering capabilities of the aircraft and of the desired comfort gives rise to the introduction, into the 3D trajectory actually followed by the aircraft of softened transitions between the straight segments of the 3D trajectory skeleton of the flight plan. These softened transitions entail changes of flight constraints at specific waypoints termed pseudo-waypoints PWP which are not mentioned in the flight plan.

The air traffic control authorities use the flight plans which are submitted to them to estimate the instantaneous theoretical positions of the aircraft in their aerial volumes and to evaluate the risks of collision. The evaluation of the risks of collision is done by allocating each aircraft its own protection corridor (a tube-shaped volume placed around the short-term theoretical position of the aircraft and oriented according to the theoretical speed vector of the aircraft) which must not intercept any other protection corridor. The width of the protection corridors takes account of the possibilities of softened transitions between two segments of a flight plan.

For the assessment of the deviations between the actual and theoretical positions of the aircraft with a view to a possible recentring of their protection volumes and of possible avoidance commands for solving newly apparent risks of collision, the air traffic control authorities call upon non cooperative means of tagging of aircrafts such as primary radars but also upon cooperative means making it possible to request information from aircraft regarding their actual instantaneous positions such as transmissions by speech with crews, secondary radars interrogating onboard responders or the ATM system hooked up by data transmission with the flight management computers of the aircraft.

When the ATM system is used, the FMS flight management computer of an aircraft provides on request the instantaneous position and the instantaneous speed vector of the aircraft as well as forecasts of date, of altitude and of speed vector of crossing of a next waypoint WP, thereby enabling the air traffic control authorities to reset the position of an aircraft with respect to its flight plan so as to make it tally with the actual situation.

In view of the softened transitions with which the trajectory actually followed is embellished, an aircraft does not necessarily pass exactly in line with a waypoint mentioned in its flight plan if the overflying of the waypoint is not compulsory. In this case, the instant of crossing of a waypoint is regarded as the instant of nearest approach.

SUMMARY OF THE INVENTION

It is an object of the present invention to improve the accuracy with which an air traffic control authority appraises the positions and the short-term trajectories of aircraft while enabling it to take account of softened transitions with which the actual trajectories of the aircraft are embellished between the consecutive segments of their flight plans. By virtue of this increased accuracy, the control authority can either improve at constant traffic the effective separation distances between aircraft deploying in its space, or increase the density of traffic for unchanged effective separation distances between aircraft.

Its subject is a method of following the course of a flight plan of a cooperative aircraft provided with an FMS flight management computer linked by a data transmission link to a control authority. The flight plan known to the control authority consists of a chaining of waypoints WP associated with local flight constraints defining a trajectory skeleton to be followed and a travel schedule to be complied with. The control authority employs the flight plan to estimate the instantaneous position of the aircraft. The flight management computer constructs, on the basis of the trajectory skeleton and of the travel schedule that are specified in the flight plan, an effective trajectory with softened lateral and vertical transitions, dimensioned so as to take account of the maneuvering capabilities of the aircraft and of a comfort instruction, and tagged by means of pseudo-waypoints PWP associated with local flight constraints, the position of a pseudo-waypoint PWP marking the start of a transition and the associated local flight constraints defining the properties of the transition. This method is noteworthy in that the FMS flight management computer of the aircraft calculates the locations of the projections of the pseudo-waypoints PWP onto the trajectory skeleton specified in the flight plan and communicates them via the data transmission link to the control authority which uses them to improve its estimate of the instantaneous position of the aircraft along its flight plan, and thus to best ensure its mission of traffic spacing and separation.

Advantageously, the FMS flight management computer of the aircraft projects the pseudo-waypoints PWP onto the trajectory skeleton of the flight plan while conserving distances, the distance to a waypoint WP of the projection of a pseudo-waypoint PWP being equal to that separating the projected pseudo-waypoint PWP from the point of the effective trajectory of the aircraft which is closest to the waypoint considered.

Advantageously, the FMS flight management computer of the aircraft projects the pseudo-waypoints PWP onto the trajectory skeleton of the flight plan while conserving distances measured as a length unit, the distance to a waypoint WP of the projection of a pseudo-waypoint being equal to that separating the projected pseudo-waypoint PWP from the point of the effective trajectory of the aircraft which is closest to the waypoint considered.

Advantageously, the FMS flight management computer of the aircraft projects the pseudo-waypoints PWP onto the trajectory skeleton of the flight plan while preserving equivalent, the distances measured as travel time, the travel time from a waypoint WP to the projection of a pseudo-waypoint PWP being taken equal to the travel time from the projected pseudo-waypoint PWP, to the point of the effective trajectory of the aircraft which is closest to the waypoint considered.

Advantageously, the FMS flight management computer of the aircraft communicates to the control authority, with the locations of the projections of the pseudo-waypoints PWP onto the trajectory skeleton specified in the flight plan, indications on the nature and the magnitude of the changes of local flight instruction that are associated with the projected pseudo-waypoints PWP.

BRIEF DESCRIPTION OF THE DRAWINGS

Other characteristics and advantages of the invention will emerge from the description of an embodiment given by way of example. This description will be offered in conjunction with the drawing, in which:

a FIG. 1 shows an exemplary architecture of an aircraft/ground system suitable for the implementation of the invention, and a FIG. 2 is a chart showing a trajectory actually followed with softened transitions and the corresponding portion of flight plan, with the positions considered on the actual trajectory as crossing of the waypoints WP and the positions on the flight plan that are communicated to the ground control as pseudo-waypoint PWP.

DETAILED DESCRIPTION OF THE EMBODIMENTS

Figure 1:
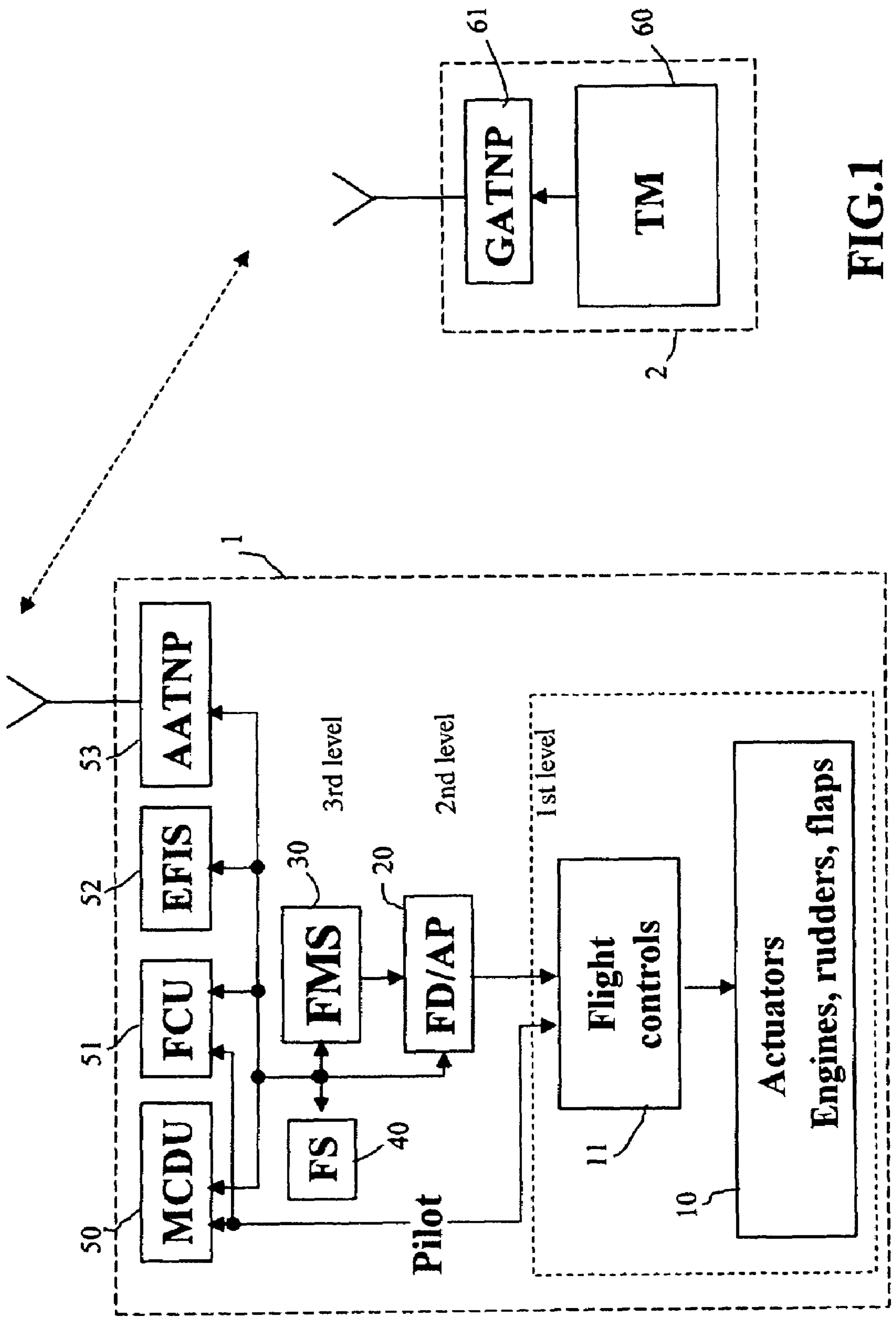

The air traffic control aircraft/ground system represented in FIG. 1 comprises an air traffic ground control station 2 with a radioelectric link to the FMS flight management computers 30 of the aircraft 1 moving within the aerial volume placed under its responsibility.

The FMS flight management computer 30 is a piece of onboard piloting equipment which acts on the behavior of an aircraft 1, by way of an automatic pilot and/or flight director FD/PA 20 and of flight control equipment 11.

Briefly, an aircraft is piloted by acting on the orientations of moveable aerodynamic surfaces (rudder, flaps, etc) and on the propulsion of the engine or engines. For this purpose it has a first indispensable level of piloting equipment which consists of actuators 10 orienting the moveable surfaces and adjusting the thrust of the engines and flight control equipment 11 (stick, rudder bars, levers, etc) which formulate position instructions for the actuators 10 and which are manipulated directly or indirectly by the crew of the aircraft. To this first level of equipment indispensable for piloting is added a second level of piloting equipment which consists of the flight director/automatic pilot FD/AP 20 the function of which is to facilitate the task of the crew by automating the following of flight instructions such as instructions for heading, for altitude, for ground speed, for vertical speed, etc. The flight director/automatic pilot FD/AP 20 operates according to two main modes: a so-called "flight director" mode where it indicates to the pilot, by way of display screens EFIS 52 ("Electronic Flight Instrument System") the orders to be given to the flight controls 11 for the following of a flight instruction and a so-called "automatic pilot" mode where it acts directly on the flight controls 11. After these first and second levels of flight equipment comes a third level consisting of the FMS flight management computer 30 the function of which is to facilitate, up as far as complete automation, the tasks of preparation and following of a flight plan.

The FMS flight management computer 30 and the FD/AP flight director/automatic pilot 20 can be parameterized by the crew by means of two man/machine interfaces, 150 termed the MCDU ("Multipurpose Control Display Unit") resembling a pocket calculator and allowing elaborate parameterization, and the other 51 termed the FCU ("Flight Control Unit") placed as a banner at the base of the windscreen of the cockpit and allowing succinct but easier parameterization than the MCDU 50. Together with the EFIS displays 52, they utilize flight information provided by flight sensors FS 40 such as a barometric altimeter or a radioaltimeter, an inertial rig or a satellite-based positioning receiver, air speed probes, etc.

In addition to this piloting equipment, the aircraft has radiocommunication equipment AATNP 53 ("Airborne Aeronautical Telecommunication Network Part") enabling it to use the ATN digital transmission network for information exchanges with the ground.

On its side, the air traffic control station 2 comprises a TM traffic management device 60 associated with GATNP radiocommunication equipment 61 ("Ground Aeronautical Telecommunication Network Part").

During mission preparation, the crew of an aircraft chooses, to get from its departure point to its destination point, a 3D trajectory with speed constraints and instructions which give rise to a travel schedule. The 3D trajectory with its travel schedule is constructed on the basis of a skeleton consisting of a chaining together of segments of large terrestrial circular arc linking the points corresponding to changes of flight instructions termed waypoints WP. The waypoints WP and the local flight constraints associated therewith constitute a document dubbed the flight plan intended on the one hand for the air traffic control authorities who use it to estimate the theoretical position of the aircraft in the aerial volumes monitored and to verify that there is no risk of collision with other aircraft and, on the other hand, to the crew and to the FMS flight management computer of the aircraft which use it to determine the trajectory and the travel schedule actually followed by the aircraft.

With a view to allowing the air traffic control station 2 to improve its estimate of the position of the aircraft made on the basis of the 3D trajectory skeleton and the travel schedule that are specified in the flight plan, the FMS flight management computer 30 of an aircraft 1 provides it, by way of the ATN aeronautical telecommunication network of the ATM system (AATNP and GATNP equipment FIG. 1), with information on the actual course of the flight plan, such as the date forecast for the crossing of a next waypoint, date of acquisition of a given altitude, etc.

The information on the actual course of the flight plan communicated by the FMS flight management computer of an aircraft to an air traffic control station in the new ATM system is however fairly restricted and does not allow the air control to take accurate account of the softenings of transition between flight plan segments effected by an FMS flight management computer with a view to taking account of the maneuvering capabilities of the aircraft and of guaranteeing a certain degree of comfort to the passengers of the aircraft. It is proposed that the information of an air traffic control station on the actual course of a flight plan be improved by supplementing the information already communicated by the FMS flight management computer of an aircraft with additional information relating to the transition softenings performed, which are easy to utilize on the basis of the flight plan.

Figure 2:
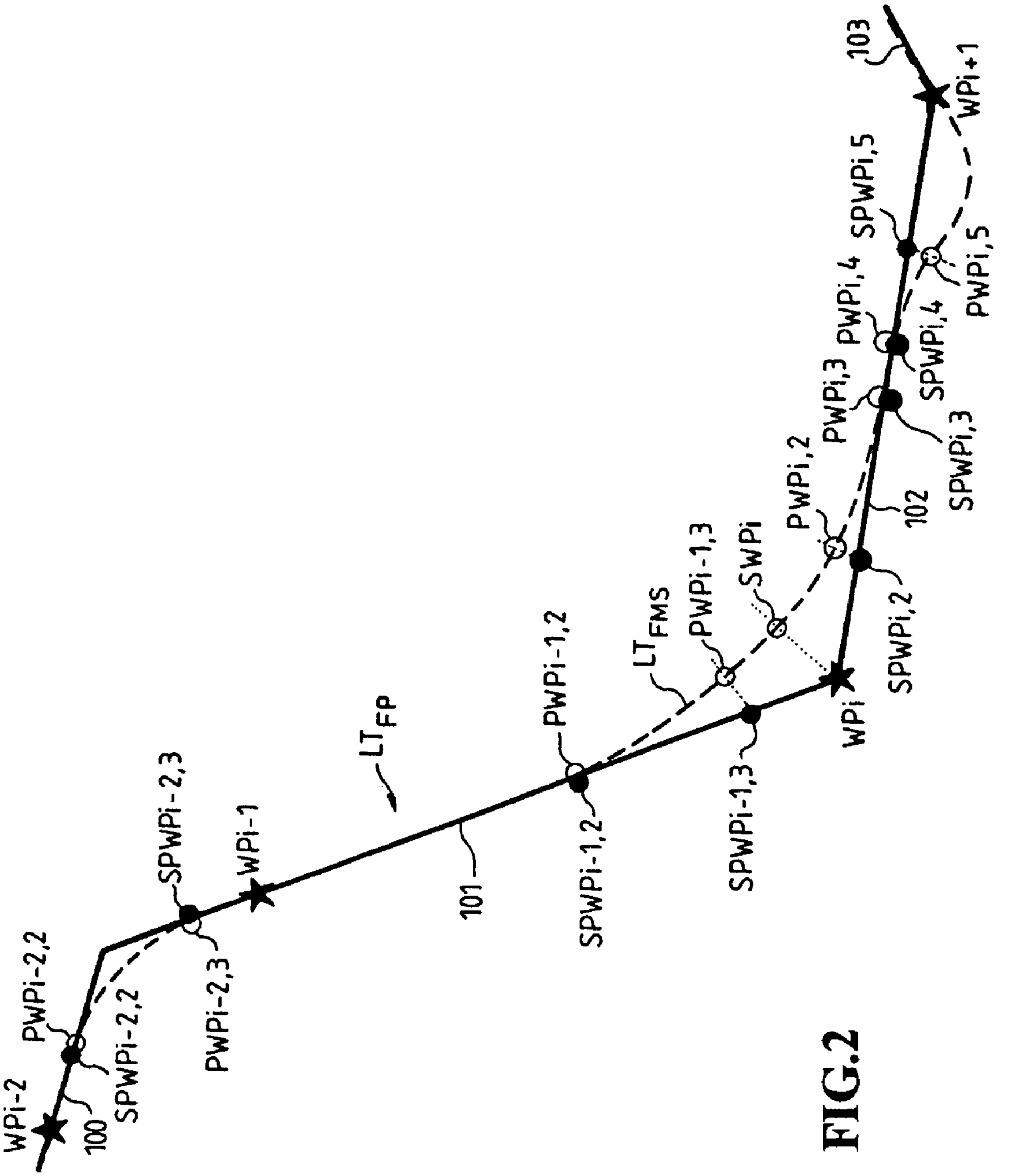

FIG. 2 illustrates, in a lateral projection, a flight plan portion $LT_{FP}$ consisting of four consecutive waypoints WPi−2, WPi−1, WPi and WPi+1 with, for the last an escape heading imposed for example, because it marks a runway entrance. Between and around these four consecutive waypoints WPi−2, WPi−1, WPi and WPi+1 are chained together four rectilinear segments: a broken arrival segment 100 passing through the waypoint WPi−2 to the waypoint WPi−1, a first intermediate homing segment 101 extending from the waypoint WPi−1 to the waypoint WPi, a second intermediate homing segment 102 extending from the waypoint WPi to the waypoint WPi+1 and an exit segment 103 leaving the waypoint WPi+1.

In view of the small deviation in heading between the arrival segment 100 and the second intermediate homing segment 102, large deviations of heading of the first intermediate homing segment 101 with respect to the arrival segment 100 and to the second intermediate homing segment 102, the flight management computer FMS chooses, for the aircraft, a trajectory $LT_{FMS}$ with softened transitions, which straightens out the chaining of the segments 100, 101, 102 of the flight plan so as to remain within the domain of maneuverability of the aircraft and comply with a comfort instruction while sticking best to the flight plan. In the same way, the FMS flight management computer softens the transition at the last waypoint WPi+1 for the taking of the imposed escape heading.

When it formulates, on the basis of the flight plan, the trajectory $LT_{FMS}$ to be followed by the aircraft, the FMS flight management computer places, on this trajectory $LT_{FMS}$, particular points PWPi,j assigned a double indexation, an indexation with an index i tagging the rectilinear segment concerned and an index j tagging their order of succession on the rectilinear segment concerned including the waypoints. These particular points PWPi,j, termed pseudo-waypoints which tag local flight instructions different from those associated with the waypoint when the pseudo-point is merged with a waypoint or changes of local flight instructions corresponding to starts of transition maneuver between segments, are not catalogued in the flight plan in contradistinction to the waypoints WPi−2, WPi−1, WPi, WPi+1.

On the broken arrival segment 100, are distinguished two pseudo-waypoints PWPi−2,2 and PWPi−2,3, marking the start and the end of the maneuver of change of heading of the aircraft so as to pass from the heading instruction associated with the waypoint WPi−2 to that associated with the waypoint WPi−1. On the first intermediate homing segment 101 are distinguished two other pseudo-waypoints, the first PWPi−1,2 corresponding to a start of change of heading maneuver of the aircraft so as to pass from the heading instruction associated with the waypoint WPi−1 to that associated with the waypoint WPi and the second PWPi−1,3 corresponding to a start of descent with a view to attaining the altitude instruction associated with the waypoint WPi+1 assumed here to mark a landing runway entrance. On the second intermediate homing segment 102 are distinguished four other pseudo-waypoints, the first PWPi,2 corresponding to a deceleration maneuver preparing for a landing, the second PWPi,3 marking the end of the change of heading maneuver performed by the aircraft so as to hold the heading instruction associated with the waypoint WPi, the third PWPi,4 marking the start of a change of heading maneuver so as to allow the actual overflying of the waypoint WPi+1 with the heading imposed and the fifth PWPi,5 marking the start of the change of heading maneuver making it possible to comply with the heading instruction associated with the overflying of the waypoint WPi+1.

During the following of the trajectory $LT_{FMS}$ adopted for the aircraft, the FMS flight management computer takes care to modify the local flight instructions when the aircraft crosses these pseudo-waypoints PWPi,j.

To facilitate and improve the following, by an air traffic ground control station, of the progress of the aircraft along its flight plan, there is provision in the ATM system for the FMS flight management computer to communicate to the ground station, via the digital aeronautical transmission network ATN, a forecast of date of crossing of the next waypoint WPi−2, WPi−1, WPi or WPi+1 to be reached. When, on account of the possibilities of softening of the transitions between segments of a flight plan, the aircraft forecasts that it will pass only in proximity to a waypoint, its flight computer regards the crossing of a waypoint WP as the crossing of the point of the trajectory actually followed by the aircraft, considered as the closest to the waypoint WP concerned. Thus, the FMS flight management computer gives as forecast of date of crossing of the waypoint WPi, the forecasted date of the passing of the aircraft at the point SWPi of its effective trajectory $LT_{FMS}$.

In addition to these dates of crossing of waypoints WPi−2, WPi−1, WPi, WPi+1, the FMS flight management computer signals, to the air traffic ground control station, the locations SPWPi−1,3; SPWPi,2; SPWPi,5 of the projections of the pseudo-waypoints PWPi−1,3; PWPi,2; PWPi,5 which it uses, on the trajectory skeleton specified in the flight plan. When it performs these projections, it conserves the distances by taking care that the distance between the projection of a pseudo-waypoint PWP and a waypoint WP is equal to that separating the projected pseudo-waypoint PWP from the point of the effective trajectory of the aircraft closest to the waypoint WP considered, it being possible for this conservation of distance to be done as a unit of length of as a unit of travel time.

The locations of the projections SPWPi,j of the pseudo-waypoints PWPi,j signaled to the air traffic ground control station are tagged by the distances, expressed as a unit of length or as a travel time, which separate them from the waypoint WPi which precedes them or from the waypoint WPi+1 which follows them.

The knowledge of the locations of the projections, on the flight plan, of the pseudo-waypoints where the aircraft embarks on its transition maneuvers allows an air traffic ground control station to estimate more accurately the instantaneous position of an aircraft outside of the moments at which it performs transition maneuvers between two segments of the flight plan and to adopt protection corridors of lesser width for the same degree of safety.

Advantageously, the information given by the FMS flight management computer on the locations of the projections, on the flight plan, of the pseudo-waypoints are supplemented with indications on the nature and the magnitude of the changes of local flight instruction that are associated with the projected pseudo-waypoints so as to indicate to the air traffic ground control station the direction in which the protection corridor associated with the aircraft must be deformed to maintain safety at the same level. The indications on the nature of the changes may consist in signaling that the location indicated is that of the projection onto the skeleton of lateral and vertical trajectories of the flight plan of a pseudo-waypoint corresponding to a start or an end of climb, a start or an end of descent, a change of vertical speed, a turn, etc. The indications on the magnitude of the changes may consist on the radius of curvature of a turn and its opening (change of heading sought), on the slope rate adopted at the start of climb or of descent, etc.

The invention claimed is:

1. A method of following the course of a flight plan of a cooperative aircraft provided with a flight management computer linked by a data transmission link to a control authority comprising the steps of: the flight plan being known to the control authority and including of a chaining of waypoints associated with local flight constraints defining a trajectory skeleton to be followed and a travel schedule to be complied with, the control authority employing the flight plan to estimate the instantaneous position of the aircraft, the flight management computer constructing, on the basis of the trajectory skeleton and of the travel schedule that are specified in the flight plan, an effective trajectory with softened lateral and vertical transitions, dimensioned so as to take account of the maneuvering capabilities of the aircraft and of a comfort instruction, and tagged by means of pseudo-waypoints associated with local flight constraints, the position of a pseudo-waypoint marking the start of a transition and the associated local flight constraints defining the properties of the transition, said method being characterized in that the flight management computer of the aircraft calculates the locations of the projections of the pseudo-waypoints onto the trajectory skeleton specified in the flight plan and communicates them via the data transmission link to the control authority which uses them to improve its estimate of the instantaneous position of the aircraft.

2. The method as claimed in claim 1, wherein the flight management computer of the aircraft projects the pseudo-waypoints onto the trajectory skeleton of the flight plan while conserving distances, the distance to a waypoint of the projection of a pseudo-waypoint being equal to that separating the projected pseudo-waypoint from the point of the effective trajectory of the aircraft which is closest to the waypoint considered.

3. The method as claimed in claim 2, wherein the flight management computer of the aircraft projects the pseudo-waypoints onto the trajectory skeleton of the flight plan while conserving distances measured as a length unit, the distance to a waypoint of the projection of a pseudo-waypoint being equal to that separating the projected pseudo-waypoint from the point of the effective trajectory of the aircraft which is closest to the waypoint considered.

4. The method as claimed in claim 2, wherein the flight management computer of the aircraft projects the pseudo-waypoints onto the trajectory skeleton of the flight plan while preserving equivalent, the distances measured as travel time, the travel time from a waypoint to the projection of a pseudo-waypoint being taken equal to the travel time from the projected pseudo-waypoint, to the point of the effective trajectory of the aircraft which is closest to the waypoint considered.

5. The method as claimed in claim 1, wherein the flight management computer of the aircraft communicates to the control authority, with the locations of the projections of the pseudo-waypoints onto the trajectory skeleton specified in the flight plan, indications on the nature and the magnitude of the changes of local flight instruction that are associated with the projected pseudo-waypoints.

* * * * *